United States Patent
Ohara

(10) Patent No.: US 10,029,433 B1
(45) Date of Patent: Jul. 24, 2018

(54) TIRE VULCANIZATION MOLD AND TIRE MANUFACTURING METHOD USING THE SAME

(71) Applicant: TOYO TIRE & RUBBER CO., LTD., Itami-shi, Hyogo (JP)

(72) Inventor: Masaaki Ohara, Itami (JP)

(73) Assignee: TOYO TIRE & RUBBER CO., LTD., Itami-shi (JP)

(*) Notice: Subject to any disclaimer, the term of this patent is extended or adjusted under 35 U.S.C. 154(b) by 0 days.

(21) Appl. No.: 15/906,357

(22) Filed: Feb. 27, 2018

(30) Foreign Application Priority Data

Mar. 13, 2017 (JP) .................. 2017-047641

(51) Int. Cl.
| | |
|---|---|
| *B29D 30/06* | (2006.01) |
| *B60C 13/00* | (2006.01) |
| *B29C 33/42* | (2006.01) |
| *B29D 30/72* | (2006.01) |

(52) U.S. Cl.
CPC ........ *B29D 30/0606* (2013.01); *B29C 33/424* (2013.01); *B29D 2030/0612* (2013.01); *B29D 2030/726* (2013.01); *B60C 13/001* (2013.01)

(58) Field of Classification Search
CPC ........ B29D 30/0606; B29D 2030/0612; B29D 2030/726; B29C 33/424; B60C 13/001
See application file for complete search history.

(56) References Cited

U.S. PATENT DOCUMENTS

| 1,567,402 A * | 12/1925 | Venn ..................... B29C 33/424 |
| | | 152/523 |
| 2,296,016 A * | 9/1942 | Bostwick .............. B29C 33/424 |
| | | 264/293 |

(Continued)

FOREIGN PATENT DOCUMENTS

| JP | 55-18088 U | 2/1980 |
| JP | 58-66930 U | 5/1983 |

(Continued)

OTHER PUBLICATIONS

Notification of Reasons for Refusal dated Jun. 29, 2017, issued in counterpart of Japanese Patent Application No. 2017-047641 with English Translation (12 pages).

(Continued)

*Primary Examiner* — James P Mackey
(74) *Attorney, Agent, or Firm* — Westerman, Hattori, Daniels & Adrian, LLP

(57) ABSTRACT

A tire vulcanization mold according to an embodiment includes a side molding surface, a stencil plate forming a convex mark at an outer surface of a side portion, and an attachment recess depressed in the side molding surface. The stencil plate includes a mark forming concave portion which is depressed from a surface by embossing and a curved portion formed by curving both end portions in a width direction in a direction opposite to the depressed direction of the concave portion. The stencil plate may be attached to the attachment recess by press-inserting. A tip of the curved portion may contact a wall surface of the attachment recess (Continued)

to be elastically deformed so that a curved state of the curved portion increases and the stencil plate may be fixed into the attachment recess by fitting.

15 Claims, 6 Drawing Sheets

(56) References Cited

U.S. PATENT DOCUMENTS

| | | | | |
|---|---|---|---|---|
| 3,518,335 | A * | 6/1970 | Jablonski | B29D 30/0606 152/523 |
| 4,547,139 | A * | 10/1985 | Hershberger | B29D 30/0606 425/192 R |
| 4,625,101 | A * | 11/1986 | Hinks | G06K 19/06028 152/523 |
| 6,942,476 | B2 * | 9/2005 | Parmelee | B29C 33/32 249/103 |
| 7,883,326 | B1 * | 2/2011 | Parmelee | B29D 30/0662 249/103 |
| 9,649,890 | B2 * | 5/2017 | Sakamoto | B60C 13/001 |
| 2014/0261947 | A1 | 9/2014 | Sakamoto et al. | |

FOREIGN PATENT DOCUMENTS

| | | |
|---|---|---|
| JP | 4-126838 U | 11/1992 |
| JP | 6-45336 U | 6/1994 |
| JP | 10-193369 A | 7/1998 |
| JP | 11-77694 A | 3/1999 |
| JP | 2005-88517 A | 4/2005 |
| JP | 3182945 U | 4/2013 |
| JP | 5421472 B1 | 2/2014 |
| JP | 2014-133402 A | 7/2014 |
| JP | 2014-172360 A | 9/2014 |
| WO | 2015/019137 A1 | 2/2015 |

OTHER PUBLICATIONS

Decision to Grant a Patent dated Nov. 9, 2017, issued in counterpart of Japanese Patent Application No. 2017-047641 with English Translation (5 pages).

* cited by examiner

US 10,029,433 B1

TIRE VULCANIZATION MOLD AND TIRE MANUFACTURING METHOD USING THE SAME

CROSS-REFERENCE TO RELATED APPLICATIONS

This application is based upon and claims the benefit of priority from the prior Japanese Patent Application No. 2017-47641, filed on Mar. 13, 2017; the entire contents of which are incorporated herein by reference.

BACKGROUND

1. Technical Field

Embodiments of the invention relate to a tire vulcanization mold for molding a tire by vulcanizing and a tire manufacturing method using the same.

2. Related Art

Generally, an outer surface of a side portion of a pneumatic tire is provided with a mark such as a letter, a symbol, or a figure in order to easily recognize a manufacturer, a type, a size, a year or week of manufacturing, and the like of the tire. In order to form such a mark, there is known a configuration in which a stencil plate formed by a metal plate of aluminum or iron is attached to a side molding surface of a vulcanization mold in a replaceable manner.

Hitherto, the mark has been formed in a concave shape in the outer surface of the side portion, but in recent years, there has been a desire to form the mark in a convex shape. In that case, when a stencil plate having a mark forming concave portion is manufactured by embossing using a thin metal plate, a convex portion 104 is formed at a rear surface side of a stencil plate 100 in accordance with a formation of a mark forming concave portion 102 as illustrated in FIG. 13. When the stencil plate 100 having such a convex portion 104 is attached to an attachment recess 108 of a side molding surface 106, a gap 112 is easily formed between the attachment recess 108 and an edge 110 of the stencil plate 100 and rubber intrudes from the gap 112 to generate membrane burrs. Due to this molding failure, an appearance is damaged.

In JP-A-2014-172360 and Japanese Patent No. 5421472, an edge of a long edge side of a stripe-shaped stencil plate is provided with a bent portion which is obliquely bent and protrudes toward a rear surface side, so that the stencil plate is stably attached into an attachment recess and a molding failure is suppressed. However, when the edge is provided with the bent portion protruding toward the rear surface side like the convex portion, a convex portion is inevitably formed around the mark of the molded tire.

SUMMARY

An object of an embodiment of the invention is to provide a tire vulcanization mold capable of suppressing a molding failure in spite of forming a mark forming concave portion by embossing so that both a good appearance quality and a reasonable manufacturing cost are obtained at the time of manufacturing a tire having a convex mark.

A tire vulcanization mold according to an embodiment of the invention includes: a side molding surface for molding an outer surface of a side portion of a tire; a mark forming stencil plate for forming a convex mark at the outer surface of the side portion; and an attachment recess which is depressed in the side molding surface so that the stencil plate is attached thereinto. The stencil plate is formed by a horizontal metal plate of which a length in a tire circumferential direction is larger than a width in a tire radial direction and includes a mark forming concave portion which is depressed from a surface by embossing and a curved portion which is formed by curving both end portions in a width direction in a direction opposite to the depressed direction of the concave portion. Then, in the tire vulcanization mold according to a first embodiment, the stencil plate is attached to the attachment recess by press-inserting. In the tire vulcanization mold according to a second embodiment, a tip of the curved portion contacts a wall surface of the attachment recess to be elastically deformed so that a curved state of the curved portion increases and the stencil plate is fixed into the attachment recess by fitting.

A tire manufacturing method according to the embodiment of the invention includes: molding a green tire by vulcanizing using the tire vulcanization mold.

According to the embodiment, since a gap is not easily formed between the attachment recess and the edge of the stencil plate by the curved portion provided in the stencil plate, a molding failure can be suppressed. For that reason, it is possible to manufacture a tire having a convex mark while obtaining both a good appearance quality and a reasonable manufacturing cost.

DETAILED DESCRIPTION

Hereinafter, embodiments will be described with reference to the drawings.

Figure 1:
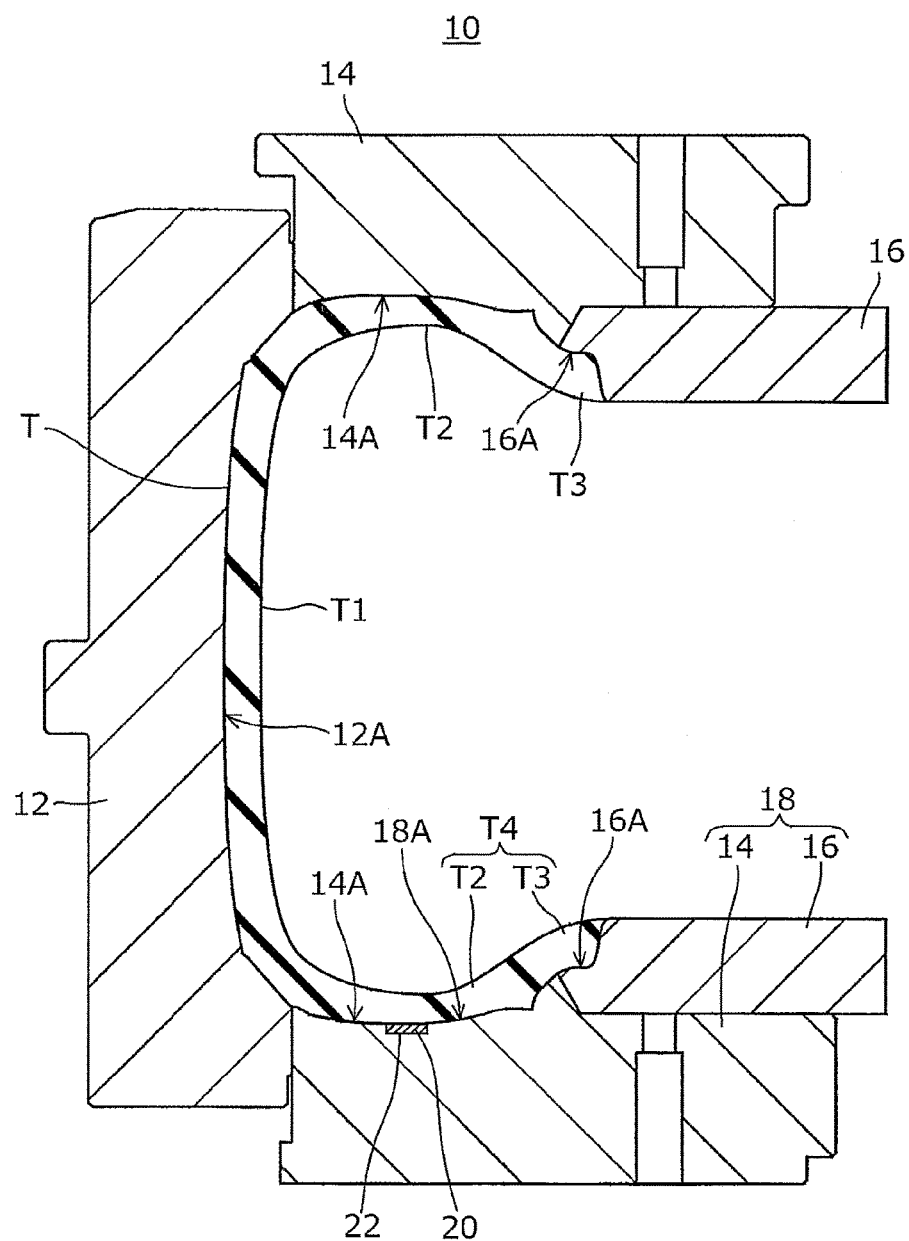
FIG. 1 is a half cross-sectional view illustrating a vulcanization state of a tire vulcanization mold according to an embodiment.

FIG. 1 is a diagram illustrating a tire vulcanization mold (hereinafter, simply referred to as a vulcanization mold) 10 according to an embodiment for molding a pneumatic tire T by vulcanizing. Here, the pneumatic tire T includes a tread portion T1 which forms a ground surface and a pair of sidewall portions T2 and T2 and a pair of bead portions T3 and T3 which extend inward in the tire radial direction from both end portions of the tread portion T1 in the width direction and has a general tire structure except for a mark provided at a side portion T4. Here, the side portion T4 has a concept including the sidewall portion T2 and the bead portion T3.

The vulcanization mold 10 is a mold which sets an unvulcanized green tire and molds a tire by vulcanizing, includes a tread mold 12 which includes a tread molding surface 12A for molding an outer surface of the tread portion T1, a pair of upper and lower sidewall molds 14 and 14 which includes sidewall molding surfaces 14A and 14A for molding outer surfaces of the sidewall portions T2, and a pair of upper and lower bead molds 16 and 16 which includes bead molding surfaces 16A for molding outer surfaces of the bead portions T3, and forms a cavity which is a space for molding the tire T.

As illustrated in FIG. 1, a side mold 18 which includes a side molding surface 18A for molding the side portion T4 includes a stencil plate 20 for forming a mark and an attachment recess 22 to which the stencil plate 20 is attached. Here, the side mold 18 has a concept including the sidewall mold 14 and the bead mold 16 and the side molding surface 18A has a concept including the sidewall molding surface 14A and the bead molding surface 16A.

In this example, the stencil plate 20 and the attachment recess 22 are provided in the sidewall molding surface 14A, but may be provided in the bead molding surface 16A or may be respectively provided in both the sidewall molding surface 14A and the bead molding surface 16A.

Figure 2:
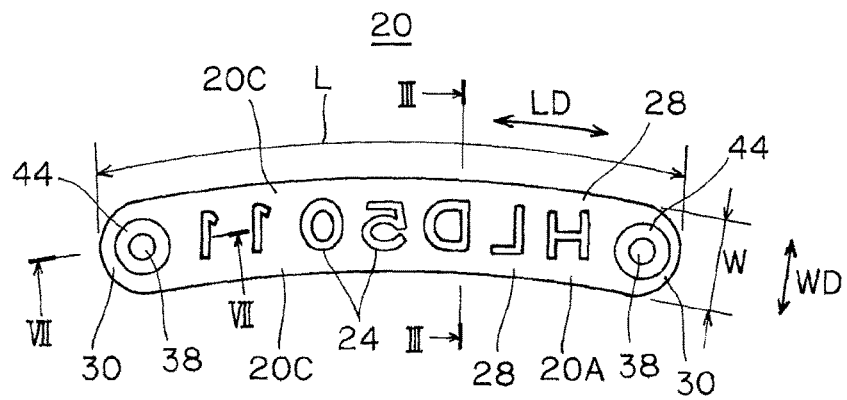
FIG. 2 is a front view of a stencil plate.
Figure 9:
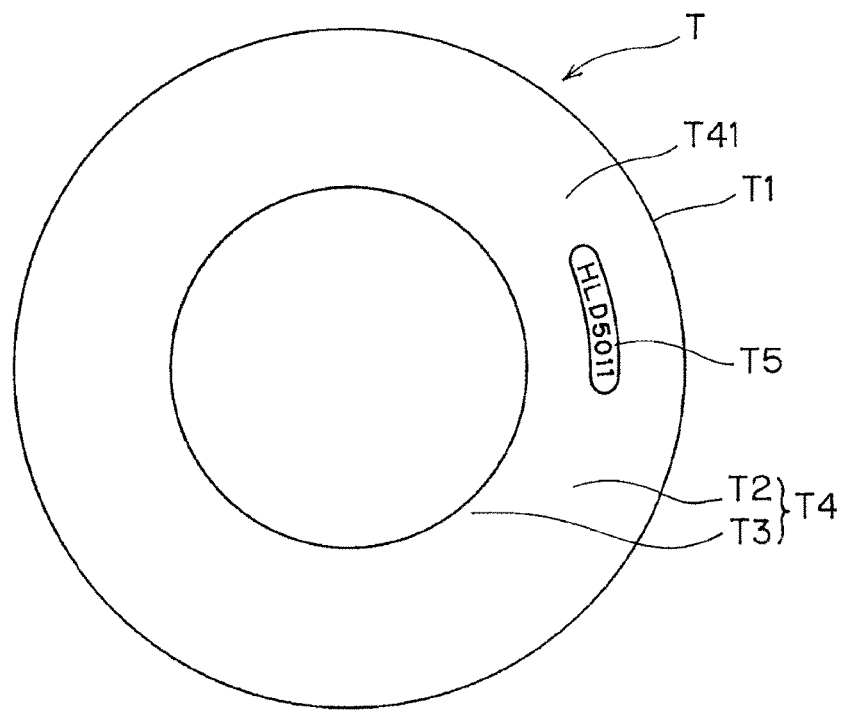
FIG. 9 is a side view of a tire.
Figure 10:
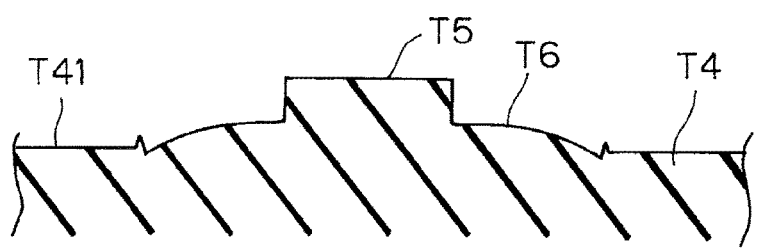
FIG. 10 is an enlarged cross-sectional view of a side portion provided with a mark.

The stencil plate 20 is a member that forms a convex mark T5 in an outer surface T41 of the side portion T4 as illustrated in FIGS. 1, 9, and 10 and is formed by a horizontal metal plate of which a length L in the tire circumferential direction is larger than a width W in the tire radial direction as illustrated in FIG. 2. Specifically, the stencil plate 20 is an elongated strip-shaped member that extends while being curved along the tire circumferential direction. A thickness t1 (see FIG. 3A) of the metal plate is not particularly limited and may be, for example, 0.2 to 0.8 mm or 0.5 to 0.7 mm.

Figure 3A:
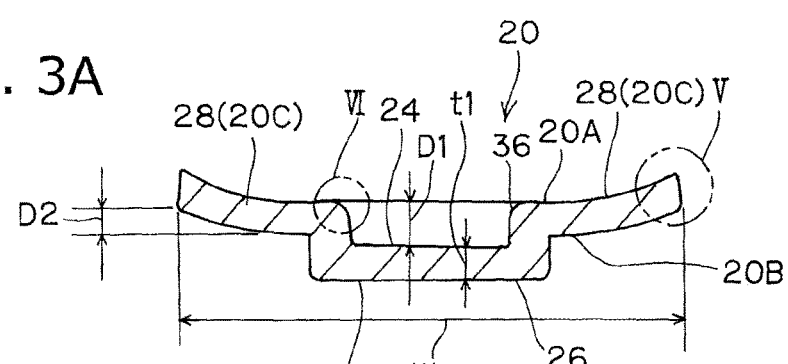
FIG. 3A is a cross-sectional view of the stencil plate taken along a line III-III of FIG. 2

As illustrated in FIGS. 2 and 3A, the stencil plate 20 includes a mark forming concave portion 24 which is depressed from a front surface 20A by embossing. That is, in the stencil plate 20, the front surface 20A facing the tire T (that is, facing the cavity) is provided with the concave portion 24 formed by embossing (an embossing method) from the front surface 20A side. The concave portion 24 has a shape in which the mark T5 formed in the outer surface T41 (see FIGS. 9 and 10) of the side portion T4 is reversed. As the mark T5, letters, symbols, or figures representing a manufacturer, a type, a size, a serial number, a manufacturing date, and the like of the tire can be mentioned. In the example of FIG. 2, a character string of "HLD5011" is set as the mark T5 and the concave portion 24 has a shape of reversing the character string. A depth D1 of the concave portion 24 from the front surface 20A is not particularly limited and may be, for example, 0.3 to 1.2 mm.

Since the concave portion 24 is formed, a convex portion 26 which corresponds to the concave portion 24 is formed in the rear surface 20B of the stencil plate 20. That is, the convex portion 26 is a view of the concave portion 24 from the rear surface 20B side of the stencil plate 20, and therefore, the protrusion height of the convex portion 26 is substantially the same as the depth of the concave portion 24.

Both end portions 20C and 20C of the stencil plate 20 in the width direction WD are formed as curved portions 28 and 28 curved or warped in a direction opposite to the depressed direction of the concave portion 24. That is, both edges at the long edge sides facing each other in the width direction WD and extending in the longitudinal direction LD of the stencil plate 20 are entirely curved in a direction opposite to the protruding direction of the convex portion 26. Thus, the curved portions 28 and 28 which extend in the longitudinal direction LD are formed at both sides with the concave portion 24 interposed therebetween.

In this example, as illustrated in FIG. 3A, the curved portion 28 is formed from a base of the concave portion 24 and is curved in a cross-sectional bent shape to be separated from a front end surface 26A of the convex portion 26 as it goes toward the tip side of the curved portion 28 in the width direction WD.

A curved amount D2 of the curved portion 28 may be larger than 0 mm and is desirably 0.3 mm or less and more desirably 0.1 to 0.3 mm. Here, as illustrated in FIG. 3A, the curved amount D2 indicates a height of the stencil plate 20 in the thickness direction from a start point in a curved state to the tip of the curved portion 28.

Figure 7:
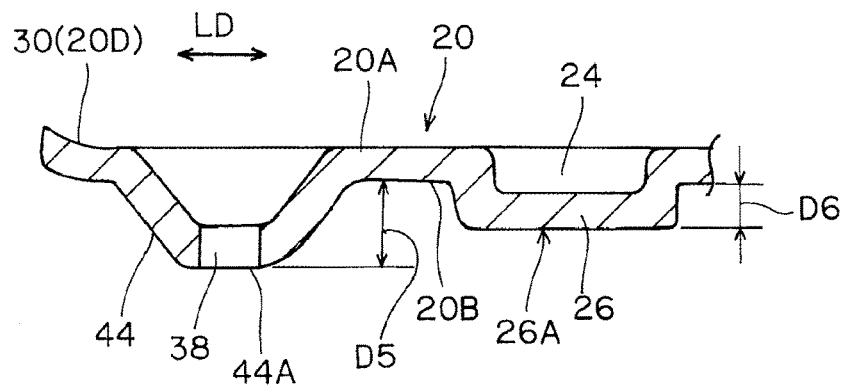
FIG. 7 is a cross-sectional view taken along a line VII-VII of FIG. 2.

Additionally, such a curved portion 28 may be formed in at least both end portions 20C and 20C in the width direction WD, but as illustrated in FIG. 7, the same curved portion 30 may be also formed at both end portions 20D and 20D of the stencil plate 20 in the longitudinal direction LD. As one embodiment, the curved portion may be formed at the entire circumferential edge of the stencil plate 20.

Figure 3B:
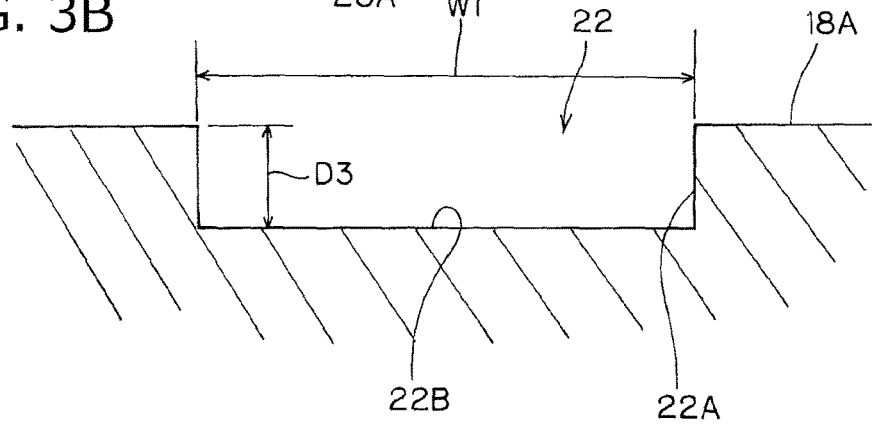
FIG. 3B is a cross-sectional view of an attachment recess to which the stencil plate is attached.

As illustrated in FIG. 3B, the attachment recess 22 is depressed in the side molding surface 18A and the stencil plate 20 is attached thereinto. The attachment recess 22 is a horizontal groove corresponding to the stencil plate 20 so that the stencil plate 20 is fitted thereto. A depth D3 of the attachment recess 22 is not particularly limited and may be, for example, 0.8 to 1.8 mm or 1.0 to 1.5 mm.

Figure 4:
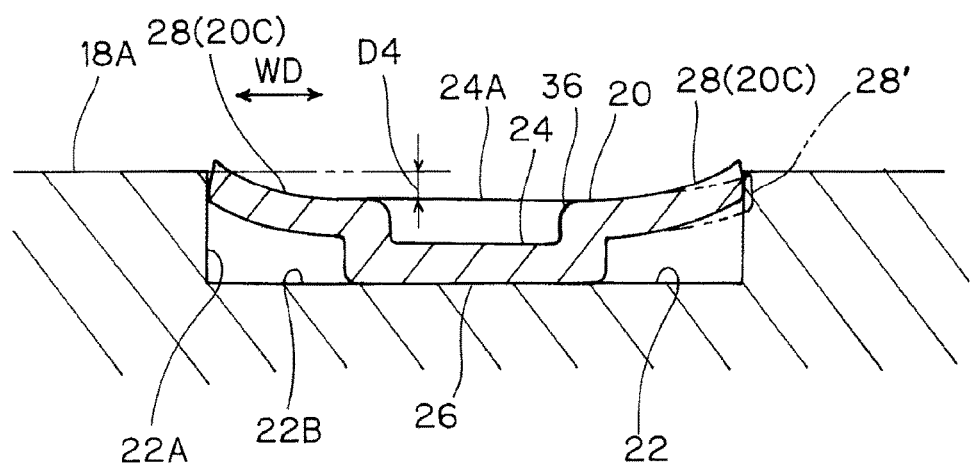
FIG. 4 is a cross-sectional view of an attachment state of the stencil plate.

The stencil plate 20 is attached to the attachment recess 22 by press-inserting. That is, a width W of the stencil plate 20 is set to be equal to or larger than a width W1 of the attachment recess 22 (see FIG. 3) and the stencil plate 20 is attached into the attachment recess 22 to be pressed thereinto. Then, as illustrated in FIG. 4, the tip of the curved portion 28 contacts a wall surface 22A of the attachment recess 22 to be elastically deformed so that the curved state of the curved portion 28 increases. In this state, the stencil plate 20 is fixed into the attachment recess 22 by fitting. Additionally, in FIG. 4, a shape of a two-dotted chain line indicated by Reference Numeral 28' illustrates a shape of the curved portion 28 before press-inserting and a curved amount of a curved shape indicated by a solid line is small. Since the stencil plate 20 is attached by using the elastic deformation of the curved portion 28 in this way, the stencil plate 20 is easily press-inserted into the attachment recess 22. In spite of this configuration, since the curved portion 28 can be brought into close contact with the wall surface 22A of the attachment recess 22 by the elastic effect, a gap therebetween can be decreased and thus the intrusion of rubber can be effectively prevented. Further, the positioning accuracy of the stencil plate 20 can be improved by the elastic effect.

Here, the press-inserting of the stencil plate 20 into the attachment recess 22 is not limited to a case where a large pressure is applied by using a pressing machine and also includes a case where the stencil plate 20 is press-inserted by a small force using a hand.

Although there is no particular limitation, the width W of the stencil plate 20 is desirably about 0.1 to 0.3 mm larger than the width W1 of the attachment recess 22.

In the embodiment, it is desirable that an opening surface 24A of the concave portion 24 of the stencil plate 20 be located at the same position or the depressed position with respect to the side molding surface 18A. In this example, as illustrated in FIG. 4, the opening surface 24A is located at a position slightly depressed with respect to the side molding surface 18A. Accordingly, as illustrated in FIG. 10, in the tire T, a mark forming surface T6 (a peripheral surface provided with the mark T5) provided with the convex mark T5 is not located at a position depressed with respect to the outer surface T41 of the side portion T4, but is formed to be flush with the outer surface T41 of the side portion T4 or entirely formed in a protruding shape to be slightly high and flat, thereby improving the visibility of the mark T5. In addition, although there is no particular limitation, it is desirable that a height difference D4 between the opening surface 24A and the side molding surface 18A be 0.3 mm or less.

Figure 5A:
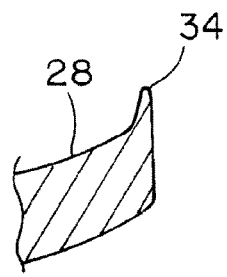
FIG. 5A is an enlarged view of a part V of FIG. 3
Figure 5B:
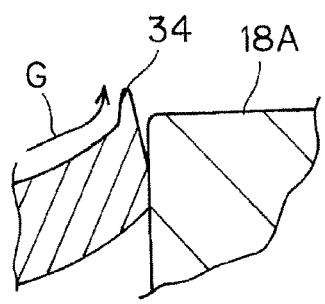
FIG. 5B is a cross-sectional view illustrating a state where the part is attached to the attachment recess.

As illustrated in FIG. 5A, a tip of the curved portion 28 of the stencil plate 20 is provided with a minute protrusion 34 which protrudes toward a curved direction (that is, a direction opposite to the depressed direction). Accordingly, as illustrated in FIG. 5B, since a flow G of rubber flowing from the concave portion 24 during vulcanizing molding can be blocked by the minute protrusion 34, it is possible to improve an effect of preventing the intrusion of rubber around the stencil plate 20. Additionally, the size of the minute protrusion 34 is not particularly limited and may be, for example, 0.2 mm or less.

Figure 6:
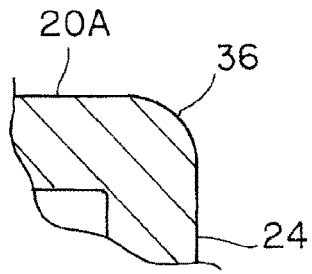
FIG. 6 is an enlarged view of a part VI of FIG. 3.

As illustrated in FIGS. 3A and 6, a chamfered portion 36 having a curvature radius of 0.3 mm or less is provided at a ridge portion forming a boundary between the concave portion 24 and the front surface 20A of the stencil plate 20. When the chamfered portion 36 is provided, a base of the molded mark T5 is formed in a curved shape by the chamfered portion 36 and thus a crack at the base of the mark T5 can be suppressed.

Figure 8:
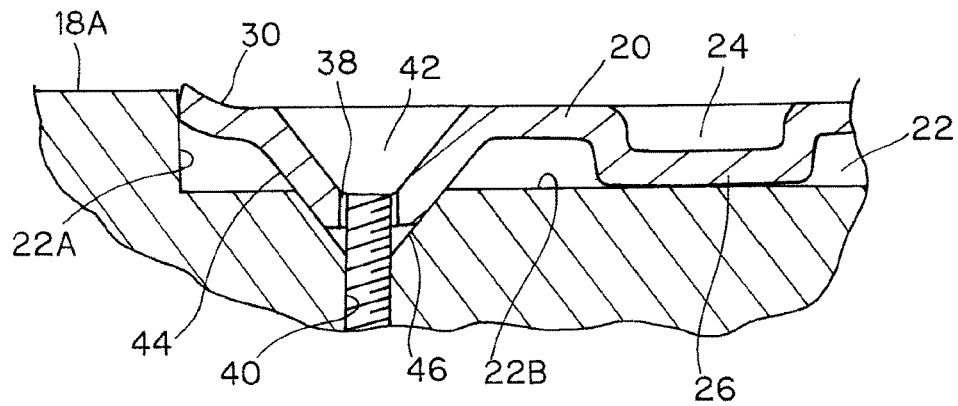
FIG. 8 is a cross-sectional view illustrating a structure in which the stencil plate is fixed to the attachment recess.

In the embodiment, the stencil plate 20 is fixed to the attachment recess 22 by a screw. Specifically, as illustrated in FIGS. 2 and 7, a penetration hole 38 is formed at both end portions of the stencil plate 20 in the longitudinal direction LD. As illustrated in FIG. 8, a screw hole 40 is formed at both end portions of the attachment recess 22 in the longitudinal direction so as to correspond to the penetration hole 38. Then, when a male screw 42 is screwed into the screw hole 40 through the penetration hole 38, the stencil plate 20 is fixed into the attachment recess 22.

The penetration hole 38 of the stencil plate 20 is formed at a top portion 44A of a tapered portion 44 depressed from the front surface 20A at both end portions of the stencil plate 20 in the longitudinal direction. That is, the stencil plate 20 is provided with the tapered portion 44 protruding toward the rear surface 20B similarly to the concave portion 24 and the tapered portion 44 is formed in a tapered shape of which a diameter gradually decreases as it goes away from the front surface 20A. Then, the top portion 44A of the tapered portion 44 is provided with the circular penetration hole 38.

As illustrated in FIG. 8, an opening of the screw hole 40 of the attachment recess 22 is formed at a tapered receiving surface portion 46 corresponding to the tapered portion 44. Further, the male screw 42 is a flat screw having a tapered head portion corresponding to the concave shape at the inside of the tapered portion 44. When the male screw 42 passing through the penetration hole 38 is threaded into the screw hole 40 while the tapered portion 44 is received by the receiving surface portion 46 of the screw hole 40, the head portion of the male screw 42 is fixed while being accommodated inside the tapered portion 44.

Here, as illustrated in FIG. 7, a protrusion height D5 of the tapered portion 44 toward the rear surface 20B is set to be larger than a protrusion height (that is, a protrusion height of the convex portion 26) D6 of the concave portion 24 toward the rear surface 20B. Desirably, both heights D5 and D6 are set so that the rear surface (that is, the convex portion 26) of the concave portion 24 does not contact the bottom surface 22B of the attachment recess 22 while the tapered portion 44 is fitted to the receiving surface portion 46 of the screw hole 40. Accordingly, it is possible to suppress deformation generated when the mark forming concave portion 24 contacts the bottom surface 22B of the attachment recess 22 during screw-fixing.

At the time of manufacturing the pneumatic tire T by using the vulcanization mold 10 with the above-described configuration, a green tire (an unvulcanized tire) is set inside the vulcanization mold 10, the mold is clamped, a bladder (not illustrated) disposed at the inside is expanded, and the green tire is pressed against the inner surface of the mold in a heated state. Accordingly, the green tire is molded by vulcanizing to thereby obtain the pneumatic tire T. In addition, the molding of the green tire can be performed by the known method.

In the obtained pneumatic tire T, as illustrated in FIG. 9, the mark T5 is formed at the outer surface T41 of the side portion T4 (in the example illustrated in the drawing, the sidewall portion T2). Since the mark T5 is formed in a convex shape protruding from the outer surface T41 of the side portion T4 as illustrated in FIG. 10, the visibility is excellent.

According to the above-described embodiment, when the stencil plate 20 is provided with the curved portion 28 as described above, a gap is not easily formed between the edge of the stencil plate 20 and the attachment recess 22 and thus a molding failure can be suppressed. For that reason, it is possible to manufacture the tire T having the convex mark T5 while securing a good appearance quality and a reasonable manufacturing cost.

Since the opening surface 24A of the concave portion 24 of the stencil plate 20 is set to be the same position or a depressed position with respect to the side molding surface 18A, the mark forming surface T6 provided with the convex mark T5 is not located at a depressed position with respect to the outer surface T41 of the side portion T4 and thus the visibility of the mark T5 can be improved.

Further, since the chamfered portion 36 is provided at a ridge portion forming a boundary between the concave portion 24 and the front surface 20A of the stencil plate 20, it is possible to suppress a crack at the base of the mark T5.

Further, since the protrusion height D5 of the tapered portion 44 of the stencil plate 20 toward the rear surface 20B for the screw-fixing is set to be larger than the protrusion height D6 of the concave portion 24 toward the rear surface 20B, it is possible to suppress deformation of the mark forming concave portion 24.

Figure 11:
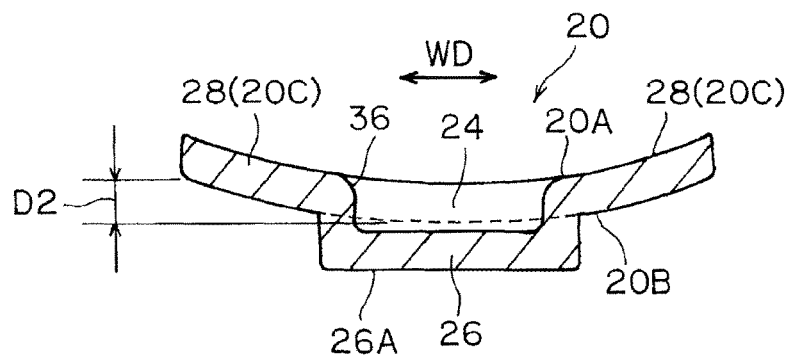
FIG. 11 is a cross-sectional view of a stencil plate according to another embodiment in a width direction.

Additionally, in the above-described embodiment, as illustrated in FIG. 3A, the curved portion 28 is formed from the base of the concave portion 24, but for example, as illustrated in FIG. 11, the curved portion 28 may be formed at both left and right sides of the stencil plate 20 in the whole width direction WD to be curved. That is, in the example illustrated in FIG. 11, the curved portion 28 is formed to be curved at each of both sides in the width direction WD by using a center position of the stencil plate 20 in the width direction as a start point of the curving and such a shape is also included in the embodiment.

Figure 12:
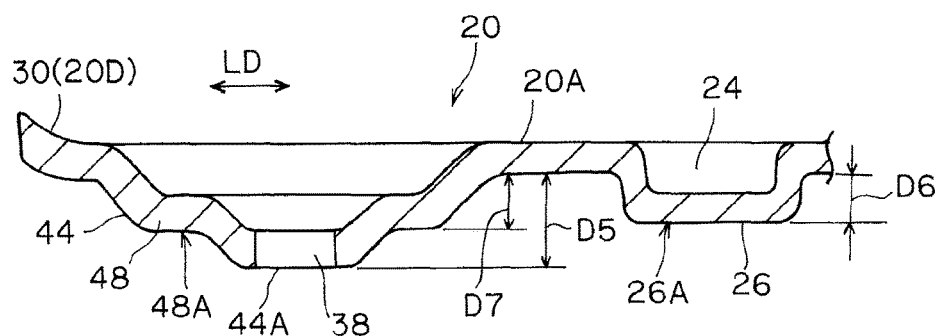
FIG. 12 is a cross-sectional view of a stencil plate according to still another embodiment in a longitudinal direction.
Figure 13:
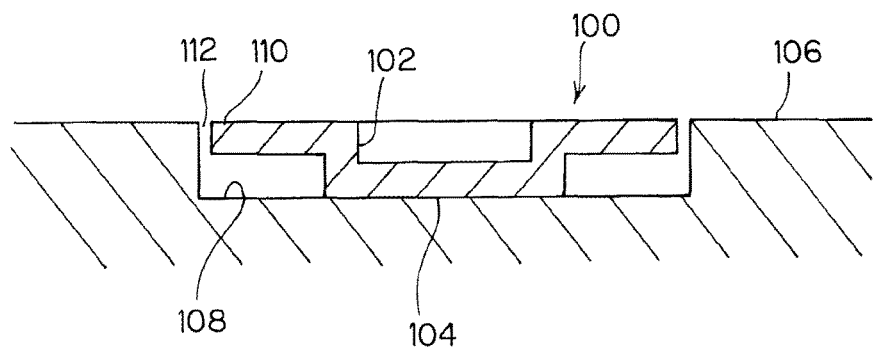
FIG. 13 is a cross-sectional view illustrating an attachment state of a conventional stencil plate.

Further, in the above-described embodiment, the tapered portion 44 at each of both end portions of the stencil plate 20 in the longitudinal direction LD is formed as a one-step taper, but as illustrated in FIG. 12, the tapered portion 44 may be formed as a multi-step taper having a flat portion 48. That is, in the example illustrated in FIG. 12, the flat portion 48 which is parallel to the front surface 20A is provided in the middle of the tapered shape and thus the tapered portion 44 is formed with two steps. With such a step shape, the tapered portion 44 can be reinforced. Further, for example, when the rear surface 48A of the flat portion 48 is set to a height to contact the bottom surface 22B of the attachment recess 22 at a timing earlier than the convex portion 26 (that is, a protrusion height D7 of the rear surface 48A is set to be larger than the protrusion height D6 of the convex portion 26), the stencil plate 20 is positioned in the depth direction of the attachment recess 22 by the contact between the rear surface 48A and the bottom surface 22B, thereby further suppressing the deformation of the mark forming concave portion 24.

The invention may comprise the following embodiments.

[1] A tire vulcanization mold comprising:
a side molding surface for molding an outer surface of a side portion of a tire;
a mark forming stencil plate for forming a convex mark at the outer surface of the side portion; and
an attachment recess which is depressed in the side molding surface so that the stencil plate is attached thereinto,
wherein the stencil plate is formed by a horizontal metal plate of which a length in a tire circumferential direction is larger than a width in a tire radial direction and includes a mark forming concave portion which is depressed from a surface by embossing and a curved portion which is formed by curving both end portions in a width direction in a direction opposite to the depressed direction of the concave portion, and the stencil plate is attached to the attachment recess by press-inserting.

[2] A tire vulcanization mold comprising:
a side molding surface for molding an outer surface of a side portion of a tire;
a mark forming stencil plate for forming a convex mark at the outer surface of the side portion; and
an attachment recess which is depressed in the side molding surface so that the stencil plate is attached thereinto,
wherein the stencil plate is formed by a horizontal metal plate of which a length in a tire circumferential direction is larger than a width in a tire radial direction and includes a mark forming concave portion which is depressed from a surface by embossing and a curved portion which is formed by curving both end portions in a width direction in a direction opposite to the depressed direction of the concave portion, and
wherein a tip of the curved portion contacts a wall surface of the attachment recess to be elastically deformed so that a curved state of the curved portion increases and thus the stencil plate is fixed into the attachment recess by fitting.

[3] The tire vulcanization mold according to [1] or [2], wherein a curved amount of the curved portion is 0.3 mm or less.

[4] The tire vulcanization mold according to any one of [1] to [3], wherein an opening surface of the concave portion of the stencil plate is located at the same position or a depressed position with respect to the side molding surface.

[5] The tire vulcanization mold according to any one of [1] to [4], wherein a ridge portion forming a boundary between the surface of the stencil plate and the concave portion is provided with a chamfered portion having a curvature radius of 0.3 mm or less.

[6] The tire vulcanization mold according to any one of [1] to [5], comprises: a penetration hole which is provided at both end portions of the stencil plate in a longitudinal direction; a screw hole which is provided at the attachment recess; and a male screw which is screwed into the screw hole through the penetration hole so that the stencil plate is fixed to the attachment recess, and wherein the penetration hole is provided at a top portion of a tapered portion depressed from the surface at the both end portions of the stencil plate in the longitudinal direction and a protrusion height of the tapered portion toward a rear surface side of the stencil plate is larger than a protrusion height of the concave portion toward the rear surface side of the stencil plate.

[7] The tire vulcanization mold according to [6], wherein the tapered portion is formed in multiple steps with a flat portion.

[8] A tire manufacturing method comprising: molding a green tire by vulcanizing using the tire vulcanization mold according to any one of [1] to [7].

While several embodiments have been described above, these embodiments have been described as examples and are not intended to limit the scope of the invention. These novel embodiments can be implemented in various other forms and various omissions, substitutions, and modifications can be made without departing from the spirit of the invention.

What is claimed is:

1. A tire vulcanization mold comprising:
a side molding surface for molding an outer surface of a side portion of a tire;
a mark forming stencil plate for forming a convex mark at the outer surface of the side portion; and
an attachment recess which is depressed in the side molding surface so that the stencil plate is attached thereinto,
wherein the stencil plate is formed by a horizontal metal plate of which a length in a tire circumferential direction is larger than a width in a tire radial direction and includes a mark forming concave portion which is depressed from a surface by embossing and a curved portion which is formed by curving both end portions in a width direction in a direction opposite to the depressed direction of the concave portion, and the stencil plate is attached to the attachment recess by press-inserting,
wherein the tire vulcanization mold comprises:
a penetration hole which is provided at both end portions of the stencil plate in a longitudinal direction;
a screw hole which is provided at the attachment recess; and
a male screw which is screwed into the screw hole through the penetration hole so that the stencil plate is fixed to the attachment recess, and
wherein the penetration hole is provided at a top portion of a tapered portion depressed from the surface at the both end portions of the stencil plate in the longitudinal direction and a protrusion height of the tapered portion toward a rear surface side of the stencil plate is larger than a protrusion height of the concave portion toward the rear surface side of the stencil plate.

2. A tire vulcanization mold comprising:
a side molding surface for molding an outer surface of a side portion of a tire;
a mark forming stencil plate for forming a convex mark at the outer surface of the side portion; and
an attachment recess which is depressed in the side molding surface so that the stencil plate is attached thereinto,
wherein the stencil plate is formed by a horizontal metal plate of which a length in a tire circumferential direction is larger than a width in a tire radial direction and includes a mark forming concave portion which is depressed from a surface by embossing and a curved portion which is formed by curving both end portions in a width direction in a direction opposite to the depressed direction of the concave portion, and the stencil plate is attached to the attachment recess by press-inserting, and
wherein a ridge portion forming a boundary between the surface of the stencil plate and the concave portion is provided with a chamfered portion having a curvature radius of 0.3 mm or less.

3. A tire vulcanization mold comprising:
a side molding surface for molding an outer surface of a side portion of a tire;
a mark forming stencil plate for forming a convex mark at the outer surface of the side portion; and
an attachment recess which is depressed in the side molding surface so that the stencil plate is attached thereinto,
wherein the stencil plate is formed by a horizontal metal plate of which a length in a tire circumferential direction is larger than a width in a tire radial direction and includes a mark forming concave portion which is depressed from a surface by embossing and a curved portion which is formed by curving both end portions in a width direction in a direction opposite to the depressed direction of the concave portion, and
wherein a tip of the curved portion contacts a wall surface of the attachment recess to be elastically deformed so that a curved state of the curved portion increases and thus the stencil plate is fixed into the attachment recess by fitting.

4. The tire vulcanization mold according to claim 1,
wherein a thickness of the metal plate of the stencil plate is 0.2 to 0.8 mm.

5. The tire vulcanization mold according to claim 2,
wherein a thickness of the metal plate of the stencil plate is 0.2 to 0.8 mm.

6. The tire vulcanization mold according to claim 1,
wherein a curved amount of the curved portion is 0.3 mm or less.

7. The tire vulcanization mold according to claim 2,
wherein a curved amount of the curved portion is 0.3 mm or less.

8. The tire vulcanization mold according to claim 3,
wherein a curved amount of the curved portion is 0.3 mm or less.

9. The tire vulcanization mold according to claim 1,
wherein an opening surface of the concave portion of the stencil plate is located at the same position or a depressed position with respect to the side molding surface.

10. The tire vulcanization mold according to claim 2,
wherein an opening surface of the concave portion of the stencil plate is located at the same position or a depressed position with respect to the side molding surface.

11. The tire vulcanization mold according to claim 3,
wherein an opening surface of the concave portion of the stencil plate is located at the same position or a depressed position with respect to the side molding surface.

12. The tire vulcanization mold according to claim 1,
wherein the tapered portion is formed in multiple steps with a flat portion.

13. A tire manufacturing method comprising:
molding a green tire by vulcanizing using the tire vulcanization mold according to claim 1.

14. A tire manufacturing method comprising:
molding a green tire by vulcanizing using the tire vulcanization mold according to claim 2.

15. A tire manufacturing method comprising:
molding a green tire by vulcanizing using the tire vulcanization mold according to claim 3.

* * * * *